United States Patent [19]

Sporer

[11] 3,753,232

[45] Aug. 14, 1973

[54] MEMORY CONTROL SYSTEM ADAPTIVE TO DIFFERENT ACCESS AND CYCLE TIMES

[75] Inventor: Michael Sporer, Somerville, Mass.

[73] Assignee: Honeywell Information Systems Inc., Waltham, Mass.

[22] Filed: Apr. 6, 1972

[21] Appl. No.: 241,618

[52] U.S. Cl. .............................................. 340/172.5
[51] Int. Cl. ............................ G06f 9/00, G11c 9/00
[58] Field of Search .................................. 340/172.5

[56] References Cited

UNITED STATES PATENTS

| | | | |
|---|---|---|---|
| 3,631,406 | 12/1971 | Kurner | 340/172.5 |
| 3,505,651 | 4/1970 | Barlow et al | 340/172.5 |
| 3,634,883 | 1/1972 | Kreidermacher | 340/172.5 |
| 3,387,283 | 6/1968 | Snedaker | 340/172.5 |
| 3,537,075 | 10/1970 | Anderson et al. | 340/172.5 |

*Primary Examiner*—Gareth D. Shaw
*Attorney*—John S. Solakian, Ronald T. Reiling et al.

[57] ABSTRACT

Logic, provided between a data processor and a memory, automatically functions independently of the access time and the cycle time of the memory utilized. The logic is further enhanced to automatically function with more than one type of memory concurrently coupled with the processor. Further, one or more memories may be concurrently coupled with more than one processor.

15 Claims, 13 Drawing Figures

Patented Aug. 14, 1973 3,753,232

5 Sheets-Sheet 2

MEMORY CONTROL SYSTEM ADAPTIVE TO DIFFERENT ACCESS AND CYCLE TIMES

BACKGROUND OF THE INVENTION

This invention relates generally to memory systems and more particularly to timing and control logic used to couple a memory with a data processor.

Logic provided to couple a data processor and a memory has in the past been designed in accordance with the specific access time of the memory (i.e., the time interval between the instant the processor calls for a transfer of information to or from the memory and the instant this operation is completed) and in accordance with the specific cycle time of the memory (i.e., the time interval between the start of successive read/-write cycles). Such logic of the prior art although capable of operating within the nominal tolerances of the respective access and cycle times of a given memory was not automatically adaptable to the wide range of access and cycle times of different memories such as semiconductor memories, core memories and read-only memories. Further, such logic of the prior art was not adapted to operate and thereby interface a processor concurrently with a plurality of memories having different access and cycle times.

It is thus an object of the invention to provide apparatus which is capable of interfacing a processor with any one of a plurality of different memories having different access and cycle times.

It is a further object of the invention to provide apparatus which is capable of interfacing a processor concurrently with a plurality of memories having different access and cycle times.

It is yet a further object of the invention to provide apparatus which is capable of interfacing one or more processors concurrently with one or more memories which may have different access and cycle times.

SUMMARY OF THE INVENTION

The purpose and objects of the invention are satisfied by providing timing and control logic for coupling at least one data processor and anyone of a plurality of memories having different memory access times and different memory cycle times. The logic includes means for providing a memory cycle. initiate request indicating that the processor has a stable address for addressing the memory; means responsive to the request for generating a data ready signal indicating that the location addressed in the memory has either been read from or written into; means responsive to the data ready signal for processing the information stored at such location addressed by the processor; and means for terminating the memory cycle after the processing of such information stored at the location addressed by the processor.

BRIEF DESCRIPTION OF THE DRAWINGS

The advantages of the foregoing configuration of the present invention become more apparent upon reading the accompaning detailed description in conjunction with the figures in which.

DETAILED DESCRIPTION OF THE PREFERRED EMBODIMENTS

Figure 1:
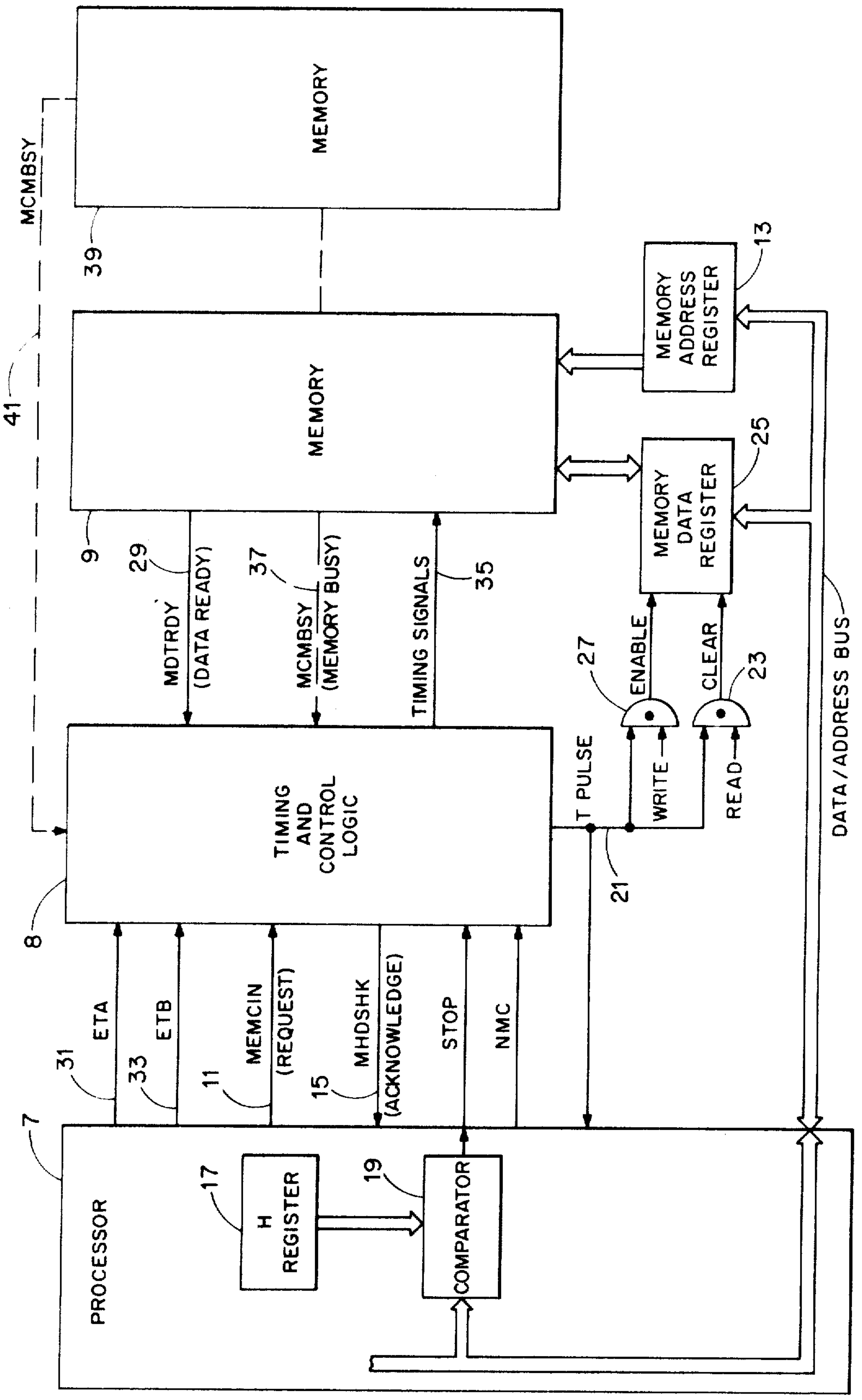
FIG. 1 is a general block diagram illustrating the environment of the apparatus of the invention.

FIG. 1 illustrates a processor 7 coupled with timing and control logic 8 and a memory 9. The processor 7 generates a request (MEMCIN) on line 11 when a stable address has been provided by processor 7 and is stored in memory address register 13. After a delay produced by the propagation time of the circuitry, logic 8 acknowledges the request signal on line 11 by the MHDSHK signal on line 15. It is at this point in time that the contents of the H register 17 in processor 7 and the address provided to memory address register 13 are compared by means of comparator 19 also in processor 7. If there is a compare, a stop signal is generated stopping further operation of the memory cycle.

After this operation, and if a stop signal is not generated, a timing signal (TPULSE) on line 21 is produced. If a read operation is to be performed during this memory cycle, AND gate 23 is enabled thereby clearing the memory data register 25. If a write operation is to be performed during this memory cycle, then AND gate 27 is enabled to transfer data into data memory register 25 from the data/address bus. A data ready signal (MDTRDY) is produced by memory 9 on line 29 when data has been transferred from the memory data register 25 during a read cycle, or when data has been taken from the memory data register 25 by the memory 9 during a write cycle. The generation of the MDTRDY signal is entirely dependent upon the access time of the memory 9. Typical access times for a core memory range between 200 to 250 nanoseconds whereas for a semiconductor memory a 300 nanosecond access time is typical. For a read only memory a faster access time in the range of 150 to 200 nanoseconds is typical.

Once the data ready signal on line 29 has been generated, the instruction addressed by register 13 is then executed during a time interval whose period is determined by the type of instruction so addressed. The time interval is governed in accordance with signals ETA and ETB on lines 31 and 33 respectively. This indicates that there are two selectable time intervals although there could have been more than two. These signals ETA and ETB are generated by processor 7 and may be generated by the comparator not shown which compares the instruction addressed with the category of instructions into which the particular instruction addressed falls. Also generated by means of timing and control logic 8 are additional timing signals on line 35 which timing signals are utilized to control the read/restore subcycles or the clear/write subcycles and the various dwell times utilized therewith during the memory cycle.

A particular memory cycle may be controlled by means of the timing control logic 8 as hereinafter explained or the particular memory cycle may be controlled by the particular memory. The former case is allowable where only one type of memory is utilized in the system environment of the invention. The latter (controlled by memory) may be utilized when there is either one type of memory 9 utilized in the system or where there is more than one type of memory (9 and 39) utilized within the system. That is, the memory busy signal (MCMBSY) as shown by the dotted line 37 must be utilized when there is included in the system more than one memory 9 and 39, each of which memories have different cycle times. The MCMBSY signal indicates that the memory is busy and is therefore performing a read/restore cycle or a clear/write cycle and is received on line 37 from memory 9 or line 41 from memory 39. The coupling (not shown) for memory 39 is similar to that of memory 9. More particularly, memory 39 is coupled to receive the timing signals on line 35 and is coupled with the registers 25 and 13 or equivalents thereof. Memory 39 is also coupled to provide its own MDTRDY signal. The processor 7 is also coupled to provide a signal indicating if such is the case, that the next cycle is a non-memory cycle (NMC).

Figure 2:
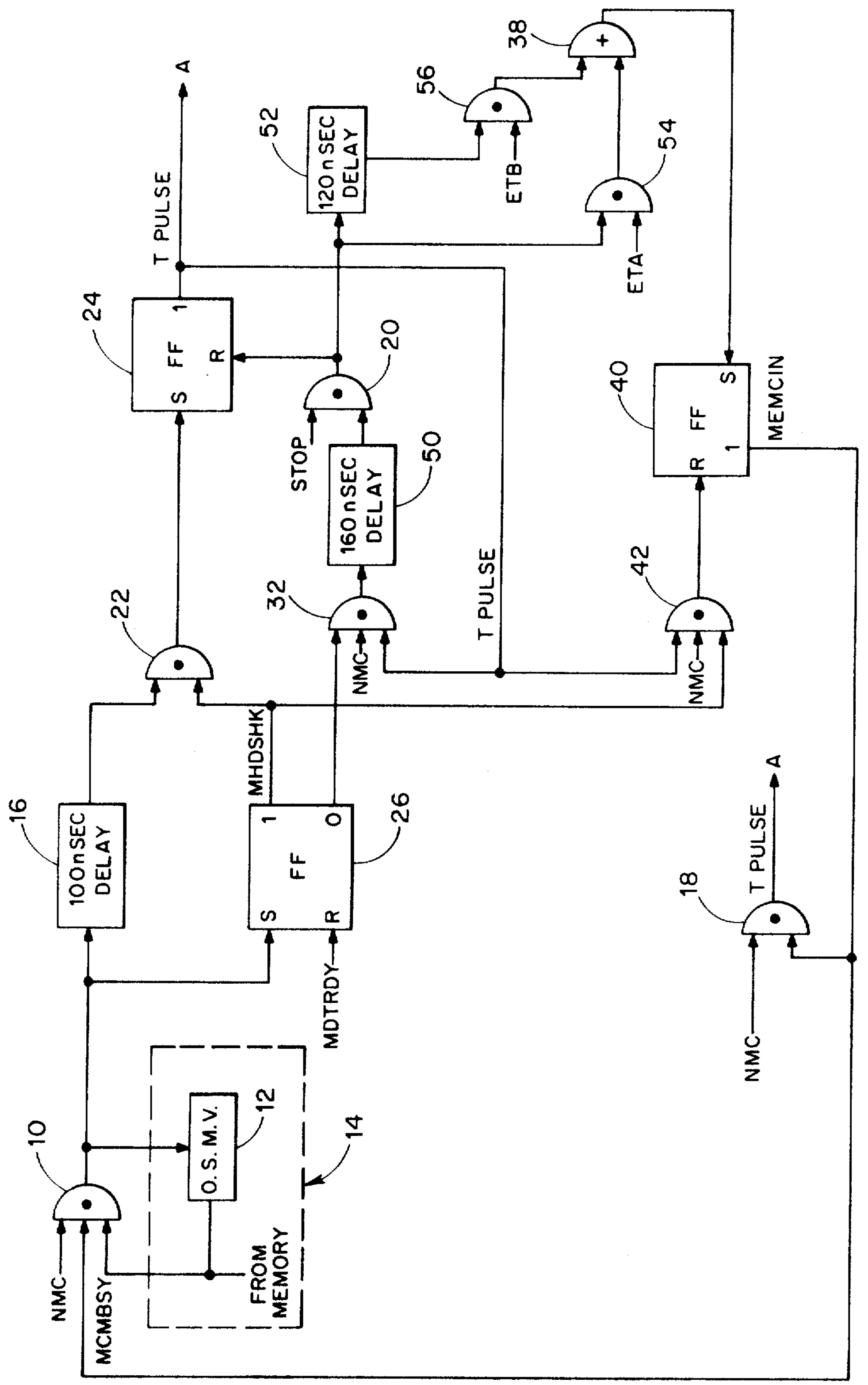
FIG. 2 is a block diagram illustrating a first embodiment of the apparatus of the invention.
Figures 3A, 3B, 3C, 3D, 3E:
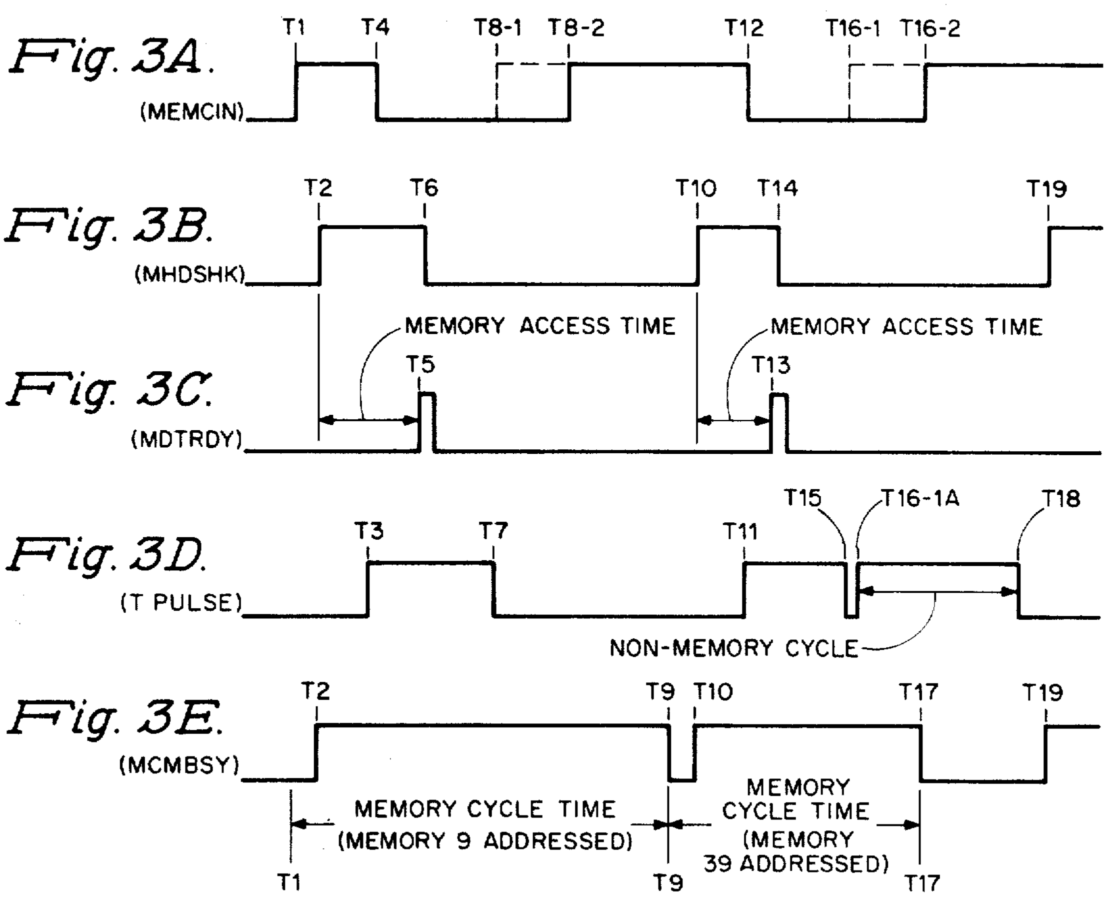
FIGS. 3A through 3E are timing diagrams illustrating the operation of the apparatus shown in FIG. 2.

Now referring to FIG. 2, there is shown logic to implement the timing and control function of the apparatus of the invention. The logic shown in FIG. 2 resides primarily in timing and control logic 8 and partially in processor 7. Various signals transmitted and received by timing and control logic 8 are shown as discussed hereinbefore in FIG. 1. The logic of FIG. 2 will now be discussed with reference to the timing diagrams of FIGS. 3A through 3E.

At time T1, a memory cycle initiate request (MEMCIN) is generated by means of flip-flop 40 included with gate 42 in processor 7. The True phase of the MEMCIN signal enables AND gate 10 which is further enabled by the False phase of the MCMBSY signal. After a propagation delay produced by gate 10 and other gates not shown, the set input of flip-flop 26 receives the enabled output signal from gate 10. Delay 16 and the one shot multivibrator 12 included in element 14 also receive the enabled output signal from gate 10 at time T2. The respective delay and time constant as shall be discussed of delay 16 and multivibrator 12 are started and the flip-flo 26 is set thereby generating the True phase of the MHDSHK signal.

Element 14 generates the MCMBSY signal by means of the one-shot multivibrator 12 coupled to the output of gate 10 or directly from the memory or memories as the system may be defined. Where the memory 9 does not have the capability of generating the MCMBSY signal, then the one-shot multivibrator 12 is set by the enabled output signal from gate 10 thereby producing a signal whose duration is equal to the memory cycle time minus, in this implementation, the propagation delay between time T1 and T2. For a core memory having a 750 nano-second cycle time and with a propagation delay of approximately 50 nanoseconds between times T1 and T2, then one shot multivibrator 12 would have a time constant of approximately 700 nanoseconds. Thus between times T2 and T9 which comprises the 700 nanosecond period, the output of one shot multivibrator 12 will produce the True phase of the MCMBSY signal. The MCMBSY signal as stated hereinbefore is produced by the respective memories such as memory 9 and memory 39 for example. The True phase of the MCMBSY signal is dependent upon the individual memories' cycle time. That is, if memory 9 is addressed, and if memory 9 has a 750 second nanosecond cycle time then the True phase of the MCMBSY signal will have a duration of approximately 700 nanoseconds; whereas if memory 39 is addressed and if memory 39 has a 500 nanosecond cycle time, then the True phase of the MCMBSY signal will be True for approximately 450 nanoseconds. In this manner memories having different cycle times may be concurrently coupled with a processor 7 thereby increasing the speed of operation of the system.

Thus, when the MCMBSY signal is True, gate 10 is disabled. Since flip-flop 26 is set, the True phase of the MHDSHK signal is produced thereby partially enabling AND gate 22 so that after a 100 nanosecond delay after time T2, gate 22 is fully enabled thereby setting flip-flop 24. The delay 16 is 100 nanoseconds so that the operation of the H register 17 and comparator 19 in processor 7 may be given sufficient time to produce the stop signal if there is a compare generated. Without the feature of the H register 17 and the comparator 19 included in processor 7, the delay 16 could have been any convenient duration.

Also at time T2 when the True phase of the MHDSHK signal is generated, a signal is sent to memory 9 (and memory 39) on line 35 thereby indicating the start of the access time.

The setting of flip-flop 24 produces the True phase of the TPULSE signal at time T3. The TPULSE signal is coupled to be received by gates 23 and 27 of FIG. 1 as hereinbefore discussed thereby either enabling the memory data register 25 during a write memory cycle or clearing memory data register 25 during a read memory cycle. The TPULSE signal is also received by gates 32 and 42, thereby partially enabling gate 32 and fully enabling gate 42 and thereby resetting flip-flop 40 such that the False phase of the MEMCIN signal is generated at time T4. The NMC signal is utilized to inhibit or enable gates as discussed hereinafter.

The memory 9 generates the True phase of the MDTRDY signal thereby indicating that a transfer of data has taken place with memory data register 25. The time at which the True phase of the MDTRDY signal is generated is dependent upon the access time of the memory, which times may be either of those access times stated hereinbefore. Thus when the True phase of the MDTRDY signal is generated at time T5, flip-flop 26 is reset thereby disabling gate 22 and gate 42 and reenabling gate 32. Thus at time T6 the phase of the MHDSHK signal is False thereby inhibiting generation of the True phase of the TPULSE signal and the MEMCIN signal until a period of time elapses which period of time is determined by the length of time required to process the instruction addressed in memory 9.

Gate 32 thus produces an output signal which is propagated through two delays, a first delay 50 which has been set for example to produce a 160 nanosecond delay and a second delay 52 which has been set to produce a 120 nanosecond delay. If the instruction currently being addressed by the processor 7 requires a 160 nanosecond execution time, then the Execution Time – A (ETA) signal is generated and enables AND gate 54 thereby enabling a signal to one input of OR gate 38 after a 160 nanosecond delay produced by delay 50. The signal enabled at the output of AND gate 54 occurs at time T8-1. If the instruction currently being addressed by the processor requires 280 nanoseconds for execution then the Execution Time-B signal (ETB) is generated enabling AND gate 56 so that after 280 nanoseconds a signal is coupled to the other input of OR gate 38. As discussed hereinbefore the ETA and ETB signals are provided by processor 7 and may be produced by conventional means such as by a decoder which examines the instruction to be processed and indicates the duration of the execution time required for that instruction. Thus between times T6 and T8-1 or T8-2, the instruction currently addressed is executed. Also at this time the processor 7 prepares the next address to be sent to register 13.

When a signal is generated by OR gate 38, the flip-flop 40 which before this was reset, is now set thereby producing the True phase of the MEMCIN signal at either time T8-1 or T8-2 depending upon which execution time signal (ETA or ETB) was enabled. Prior to either times T8-1 or T8-2 the TPULSE signal goes to its False phase at time T7 which occurs at a convenient time after the transition of the MHDSHK signal from the True phase to the False phase at time T6. In this case the resetting of flip-flop 24 is accomplished by means of the signal enabled via gate 32 and the delay 50. During these operations, AND gate 20 is enabled. The only time that AND gate 20 is disabled thereby inhibiting the setting of flip-flop 40 and the resetting of flip-flop 24 is when the stop signal is produced by processor 7. Thus when a stop signal is produced, the MEMCIN signal does not go to the True phase at either times T8-1 or T8-2 nor does the TPULSE signal go to the False phase at time T7. This inhibits further execution of the instruction addressed in memory 9.

At the end of the memory cycle, that is at time T9, the MCMBSY signal goes from the True phase to the False phase. At this time and with the MEMCIN signal in the True phase, AND gate 10 is again enabled so that after approximately a 50 nanosecond delay produced by gate 10 and other gates not shown, the MHDSHK signal goes to the True phase at time T10. At said time T9, the cycle starts to repeat and with the True phase of the MEMCIN signal generated and further with the True phase of the MHDSHK signal generated at time T10, the memory cycle is in progress and may repeat for the particular memory 9 having the same access and cycle times or the memory 39 may be addressed during the next cycle such that its access and cycle times control the next memory cycle. The memory 9 was stated to have by way of example an access time of 200 nanoseconds and a cycle time of 750 nanoseconds each of which occurred between times T1 and T9.

Again referring to FIGS. 3A through 3E, a memory cycle is shown starting at time T9 wherein the memory 39 is addressed. For purposes of illustration it is assumed that memory 39 has an access time of 150 nanoseconds and a cycle time of 500 nanoseconds. Thus at time T11 the True phase of the TPULSE signal is generated after which at time T12 the MEMCIN signal goes to the False phase. After the MDTRDY signal goes to the True phase at time T13, this time being dependent upon the access time of memory 39, the MHDSHK signal goes to the False phase. At time T15, the TPULSE signal goes to the False phase and at times T16-1 or T16-2 the MEMCIN signal goes to the True phase. At time T17 the memory cycle terminates as indicated by either the one-shot multivibrator 12 or as dtermined by the memory 39, such that the MCMBSY signal goes to the False phase. It might be noted that the memory cycle time of memory 39 lapses at time T17 just after by this example the time T16-2 has provided for the instruction which takes 280 nanoseconds to execute. Should the memory cycle time have been less than 500 nanoseconds for memory 39, and should therefore the MCMBSY signal have gone to the False phase prior to time T16-2, the logic of the invention would still operate since the gate 10 although partially enabled by the False phase of the MCMBSY signal would not be enabled because the MEMCIN signal would still be False. It would not be until the MEMCIN signal goes to the True phase that gate 10 would be enabled thereby generating the MHDSHK signal at which time there is an indication to the memory that the access time is allowed to commence.

For the purposes of illustration, assuming that the MEMCIN signal went to the True phase at time T16-1 thereby indicating that the execution of the instruction addressed at time T10 is complete, then if the next cycle is to be a memory cycle, the timing would proceed as previously shown in FIGS. 3A through 3E. If the succeeding cycle is to be a non-memory cycle, (i.e., access to memory 9 or 39 is not required) the processor 7 waits for the processing of data to be completed, that is, as for example at time T16-1, and then generates the True phase of the next TPULSE at time T16-1A. The processor 7 detects by conventional means internal to it that the next cycle is to be a non-memory cycle and generates an NMC signal which is utilized to inhibit gate 10 thereby preventing the MHDSHK signal from going to the True phase. Thus the next memory cycle is inhibited until the non-memory cycle is allowed to be executed during a fixed length of time between times T16-1A and time T18 during which time the TPULSE is in the True phase. The NMC signal is also utilized to inhibit the enabling of gates 32 and 42.

The NMC signal is coupled to one input of AND gate 18 whose output is coupled with the output of flip-flop 24 as indicated by the letter A and the other input to gate 18 is coupled to the output of flip-flop 40. AND gate 18 is enabled to produce a TPULSE when the MEMCIN signal is in the True phase and the NMC signal is generated. The NMC signal being True indicates that the instruction to be executed during the present memory cycle has been so executed. Thus the next cycle which by this example is a non-memory cycle may be allowed to operate. When the non-memory cycle expires at time T18, the beginning of the next cycle, in this case a memory cycle, is indicated at time T19. The system then repeats any of the above mentioned cycles as required.

Figure 4:
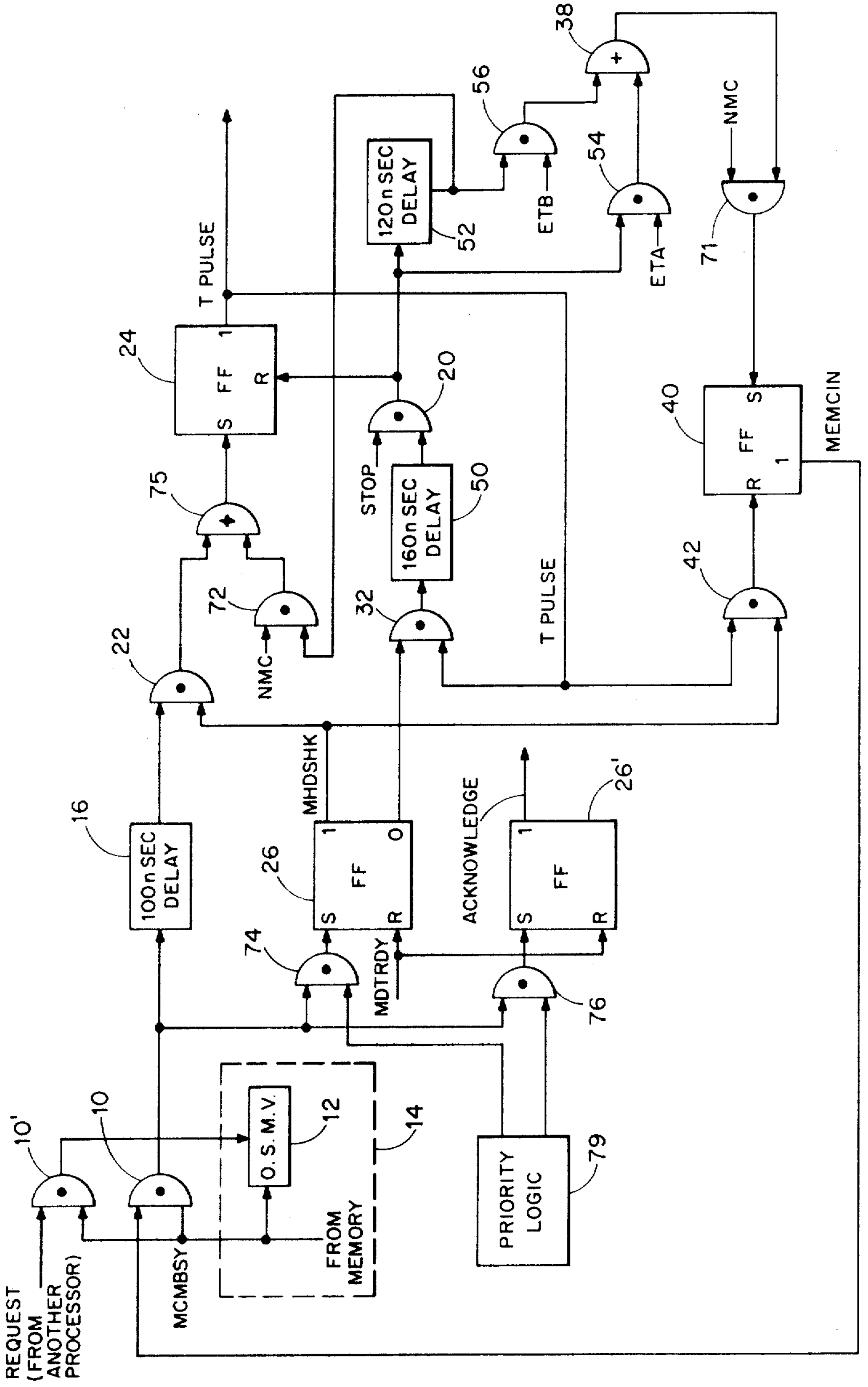
FIG. 4 is a block diagram illustrating a second embodiment and further enhancements of the apparatus of the invention.
Figure 5A:
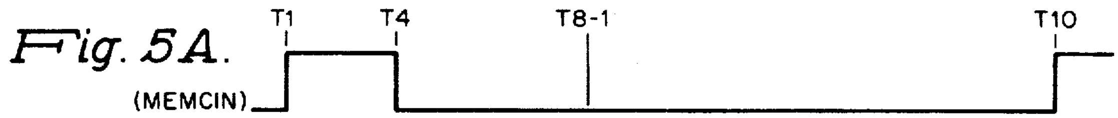
FIGS. 5A through 5E are timing diagrams illustrating the operation of the apparatus shown in FIG. 4.
Figure 5B:
Figure 5C:
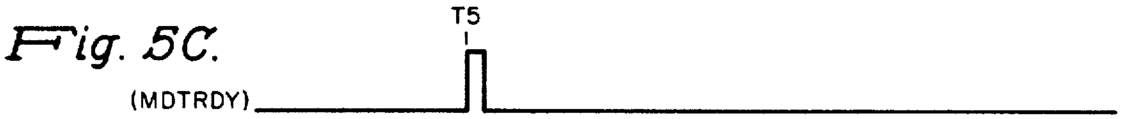
Figure 5D:
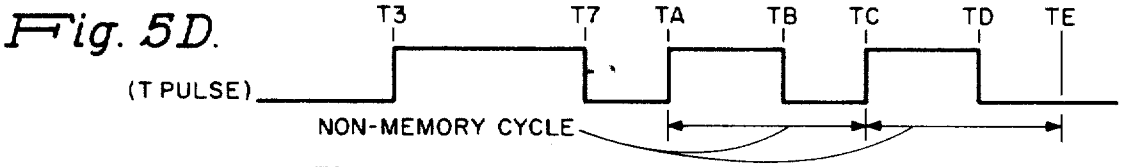
Figure 5E:

The logic of FIG. 4 illustrates an additional embodiment of the apparatus of the invention and further illustrates a technique for enabling the use of more than one processor coupled with one or more memories. The logic of FIG. 4 is essentially the same, in part, as the logic of FIG. 2. Accordingly in those cases where the logic is similar, like reference numerals are used. The logic of FIG. 4 will now be explained with reference to the timing diagram of FIGS. 5A through 5E.

FIG. 5 illustrates between times T1 and T9 a memory cycle (750 nanoseconds in duration) similar to that first shown starting at time T1 in FIG. 3 except that by way of example the processing starting from time T6 is completed at time T8-1 for the instruction addressed at time T1. Further, by way of example, there are shown two non-memory cycles occurring after the completion of processing at time T8-1. The True phase of the MEMCIN signal is not generated at time T8-1 because of the inhibiting of the output of gate 38 by gate 71 which is not enabled because of the NMC signal. Thus, flip-flop 40 of processor 7 is not set. Also from time T1, the memory cycle proceeds as hereinbefore described until time T8-1. At time T8-1, since the NMC signal has been generated indicating that a non-memory cycle is to occur next, the operation is as follows. Logic for coupling more than one processor will be explained hereinafter.

At time T8-1, the phase of the MEMCIN signal remains False since as explained hereinbefore the AND gate 71 is disabled by the NMC signal. The flip-flop 24 which had been previously reset at time T7, is set after the 120 nanosecond delay of delay 52 by means of AND gate 72 enabled by the NMC signal and by means of OR gate 75 whose output is coupled to set flip-flop 24 thereby generating the True phase of the TPULSE signal at time TA. Time TA is the beginning of the first non-memory cycle which ends by way of example after 280 nanoseconds (delays 50 and 52) at time TC. With the True phase of the TPULSE signal generated and with the True phase of the other input to gate 32 generated, gate 32 is enabled thereby resetting flip-flop 24 after a 160 nanosecond delay terminating at time TB and further, after a 120 nanosecond delay, again setting flip-flop 24 via gates 72 and 75 if the next cycle is also to be a non-memory cycle.

Since the next cycle by way of example is also a non-memory cycle, at time TC the True phase of the TPULSE signal is generated thereby initiating the next non-memory cycle which terminates at time TE. Flip-flop 24 is again reset at time TD after the delay time provided by delay 50. However, since by way of example, the next cycle after time TE is not a non-memory cycle, flip-flop 24 is not set at time TE and accordingly the TPULSE signal remains in the False phase. This is the case since AND gate 72 is not enabled because of the absence of the NMC signal. Further, because of the absence of the NMC signal, gate 71 is enabled by either gate 54 (gate 54 by this example) or gate 56, the decision being made by ETA (ETA by this example) or ETB as indicated by processor 7 as explained hereinbefore. The True phase of the MEMCIN signal is thereby generated at time T10. After a propogation delay, both the MCMBSY signal and the MHDSHK signal go to the True phase at time T11 and the memory cycle continues as hereinbefore described. Thus, it can be seen that one or more non-memory cycles may be provided in an overlayed time relationship with the memory cycle starting after the processing required for such memory cycle. Further, it can be seen that such non-memory cycles may be initiated with minimal delay taking advantage of logic which exists for other functions.

Now referring to the multi-processor capability of the apparatus of the invention, there is shown an additional gate 10' for another processor, (it being noted that more than one processor may have been added) which gate 10' is coupled to receive the MCMBSY signal from element 14 and a Request signal from the other processor (hereinafter designated second processor). The Request signal is analogous to the MEMCIN signal from flip-flop 40 and may be if desired generated in a similar manner, i.e., by elements analogous to gate 42 and flip-flop 40. Thus, the gate 10' provides an output signal similar to that provided by gate 10 as explained hereinbefore. The enabled output of either gate 10 or 10' is coupled to flip-flops 26 and 26' via AND gates 74 and 76 respectively one of which is enabled via priority logic 79.

Priority logic 79 enables either gate 74 or 76 depending upon which processor has priority. The system may be utilized with three or more processors, however, in a system coupling just two processors, this priority may be based on a toggled arrangement if so desired. That is, each processor would have access to one or more memories alternately. The enabling of either gate 74 or 76 sets either flip-flop 26 or 26' respectively. The coupling of the outputs of flip-flop 26 have been discussed hereinbefore. The 1 output of flip-flop 26' is coupled to produce an Acknowledge signal which is similar to the MHDSHK signal generated via flip-flop 26. The Acknowledge signal is coupled back to the second processor as was the MHDSHK signal coupled to gate 42 in processor 7. The Acknowledge signal may be utilized by the second processor so as to generate those timing signals required for proper operation with the one or more memories 9 and 39. For example, the second processor may require different instruction operation times from the 160 and 280 nanosecond time periods allocated in processor 7. Accordingly, the second processor could generate its own Execution Time signals analogous to the ETA and ETB signals in order to generate the Request signal such as by an element similar to flip-flop 40 in processor 7.

Having described the invention what is claimed as new and novel and for which it is desired to secure Letters Patent is:

1. Timing and control logic for coupling a data processor and any memory of a plurality of memories having different memory access times and different memory cycle times, said logic comprising:

A. means for providing a memory cycle initiate request indicating that said processor has provided an address for addressing said memory;

B. means, responsive to said request, for generating a data ready signal indicating that the location addressed in said memory has either been read from or written into, wherein said means for generating said data ready signal comprises 1. means, responsive to said request, for generating an acknowledge signal after a first predetermined time period;

2. means, responsive to said acknowledge signal, for commencing the running of the access time of said memory, and 3. means, responsive to the completion of said access time, for providing said data ready signal;

C. means, responsive to said data ready signal, for processing the information stored at said location addressed by said processor; and D. means for terminating said memory cycle after said processing of said information stored at said location addressed by said processor.

2. The logic of claim 1 further comprising:

A. means, responsive to said acknowledge signal, for generating a clock signal before the generation of said data ready signal; and B. means, responsive to said clock signal, for initiating conditions preparatory to reading information from or writing information into said memory.

3. The logic of claim 2 further comprising:

A. means for storing a first address;

B. means for comparing said first address with said address provided by said processor; and C. means for terminating the operation of said logic when said first address and said address provided by said processor are similar.

4. The logic of claim 3 further comprising means for enabling said means for comparing between the time said acknowledge signal is generated and the time said clock signal is generated.

5. The logic of claim 2 further comprising:

A. a memory data register coupled with said memory for transferring information into or out of the addressed location of said memory;

B. means, responsive to said clock signal, for clearing the contents of said memory data register preparatory to the reading of information out of said memory into said memory data register; and C. means, responsive to said clock signal, for entering information into said memory data register preparatory to the writing of said entered information into said memory from said memory data register.

6. The logic of claim 5 wherein said means for processing comprises:

A. means for determining the type of information stored at said location addressed by said processor;

B. means for providing a time interval for executing the instruction included in said information, said time interval dependent upon the type of said information; and C. means for generating a first signal upon the termination of said time interval.

7. The logic of claim 6 further comprising:

A. means for determining that the next instruction to be executed by said processor does not require access with said memory; and B. means responsive to said first signal, for executing said next instruction.

8. Timing and control logic for coupling a data processor and a memory, said logic comprising:

A. means for generating a first signal when said processor has a valid address for addressing a location in said memory;

B. means, responsive to said first signal, for generating a second signal;

C. means, responsive to said second signal, for initiating conditions preparatory to reading of information from said addressed location of said memory;

D. means, coupled to receive a third signal from said memory, for indicating that said memory has read said information from said addressed location, said third signal being generated by said memory after a time interval solely dependent upon the access time of said memory;

E. means, responsive to said third signal, for operating upon said information read from said addressed location; and F. means for terminating said coupling provided by said logic after a predetermined time period from the generation of said first signal.

9. Timing and control logic for coupling a data processor with a first memory and a second memory, said first memory having a first access time and a first cycle time, and said second memory having a second access time and a second cycle time, said logic comprising:

A. means for addressing either said first or said second memory;

B. means for generating a cycle request signal when either said first or said second memory is addressed by said means for addressing;

C. means, responsive to said cycle request signal, for generating a first signal;

D. means, responsive to said first signal, for initiating conditions of the addressed memory preparatory to reading or writing information with said addressed memory;

E. means for generating a data ready signal after the expiration of either said first access time or said second access time dependent upon which of said memories is addressed, said data ready signal indicating that information has either been read from or written into said memory;

F. means, responsive to said data ready signal, for executing said information read from said addressed memory; and G. means for terminating said coupling provided by said logic after the expiration of either said first cycle time or said second cycle time dependent upon which of said memories is addressed.

10. The logic of claim 9 further comprising:

A. means for storing a first address;

B. means for comparing said first address with said address provided by said processor; and C. means for terminating the operation of said logic when said first address and said address provided by said processor are similar.

11. The logic of claim 9 further comprising:

A. a memory data register coupled with said memories for transferring information into or out of the addressed one of said memories;

B. means, responsive to said first signal, for clearing the contents of said memory data register preparatory to the reading of information out of said addressed memory into said memory data register; and C. means, responsive to said first signal, for entering information into said memory data register preparatory to the writing of said entered information into said addressed memory from said memory data register.

12. The logic of claim 9 further comprising:

A. means for determining that the next instruction to be executed by said processor does not require access with either of said memories; and B. means for executing said next instruction immediately following the execution of said information read from said addressed memory.

13. Timing and control logic for coupling a first processor and a second processor with a memory, said logic comprising:

A. means for generating a first signal when either said first processor or said second processor has an address for addressing a location in said memory;

B. means, responsive to said first signal, for generating a second signal;

C. means, responsive to said second signal, for initiating conditions preparatiory to reading of information from said addressed location of said memory;

D. means, coupled to receive a third signal from said memory, for indicating that said memory has read said information from said addressed location, said third signal being generated by said memory after a time interval solely dependent upon the access time of said memory;

E. means, responsive to said third signal, for operating upon said information read from said addressed location; and F. means for terminating said coupling provided by said logic after a predetermined time period from the generation of said first signal.

14. The logic of claim 13 further comprising:

A. first means for acknowledging the generation of said first signal;

B. second means for acknowledging the generation of said first signal; and

C. priority control means for enabling one of said processors to have access to said memory, said priority control means having means for inhibiting the acknowledgment of either said first or second means for acknowledging dependent upon which of said processors is enabled for access to said memory.

15. Timing and control logic for coupling either of first and second processors with either of first and second memories, said first memory having a first access time and a first cycle time, and said second memory having a second access time and a second cycle time, said logic comprising:

A. priority control means for enabling one of said processors;

B. means for addressing either said first or said second memory;

C. means for providing an address to said means for addressing from said enabled one of said processors;

D. means for generating a cycle request signal when either said first or said second memory is addressed by said means for addressing;

E. means, responsive to said cycle request signal, for generating a first signal;

F. means, responsive to said first signal, for initiating conditions of the addressed memory preparatory to reading or writing information with said addressed memory;

G. means for generating a data ready signal after the expiration of either said first access time or said second access time dependent upon which of said memories is addressed, said data ready signal indicating that information has either been read from or written into said memory;

H. means, responsive to said data ready signal, for executing said information read from said addressed memory; and I. means for terminating said coupling provided by said logic after the expiration of either said first cycle time or said second cycle time dependent upon which of said memories is addressed.

* * * * *